United States Patent Office 2,748,141
Patented May 29, 1956

2,748,141
PROCESS OF MAKING PHENYLPYRIDYL-CARBINOLS

Francis E. Cislak, Indianapolis, Ind., assignor to Reilly Tar & Chemical Corporation, Indianapolis, Ind., a corporation of Indiana No Drawing. Application February 1, 1956,
Serial No. 562,641

5 Claims. (Cl. 260—297)

This invention relates to a new process for the manufacture of phenylpyridylcarbinols. More particularly, it relates to the process of making phenyl-2-pyridylcarbinols and phenyl-4-pyridylcarbinols, which compounds may be represented by the following formulae:

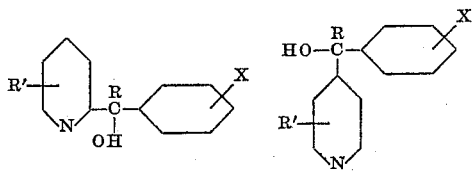

in which X represents hydrogen or halogen, R represents hydrogen, alkyl, aryl, and alkaryl, and R' represents hydrogen or alkyl.

In recent years many antihistaminic agents have been developed. Some of the more effective ones use as their starting material a phenyl-2-pyridylcarbinol, or a substituted phenyl-2-pyridylcarbinol. The prior art discloses many methods for the preparation of phenyl-2-carbinols. Overhoff and Proost [Rec. trav. chim. 57, 179 (1938)] describe one method of preparing phenyl-2-pyridylcarbinol: They react 2-bromopyridine with magnesium to form pyridyl-magnesium bromide. This latter compound is then condensed with benzaldehyde to give phenyl-2-pyridylcarbinol.

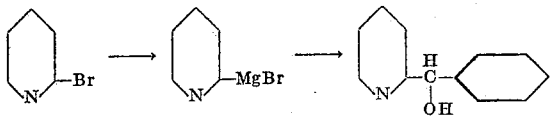

There are several drawbacks to the above process: 1. The yield of pyridylmagnesium bromide is only 10–16%. 2. The yield on the second step, i. e., the condensation of the pyridylmagnesium bromide is only 49%; in other words, the overall yield starting with the high priced 2-bromopyridine is only about 5%.

Ashworth et al. [J. Chem. Soc. 1939, 809] have found that phenyl-2-pyridylcarbinol can be prepared by the condensation of picolinic acid with benzaldehyde.

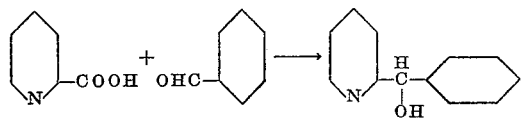

They report a yield of about 35% based on the picolinic acid used. Picolinic acid is not a commercially available chemical; it can be custom made; however, the current price for such custom manufacture is $15.00 per pound.

Sperber et al. studied the Ashworth process with the object of improving the yield. They claim [J. Amer. Chem. Soc. 71, 887 (1949)] to have enhanced the yield by using p-cymene as a solvent. But even then the yield was only 49%.

Tilford et al. [J. Amer. Chem. Soc. 70, 4001 (1948)] modified the method of Emment and Asendorf [Berichte 72B, 1188 (1939] in which benzaldehyde was condensed with pyridine in the presence of aluminum or magnesium, mercuric chloride and iodine

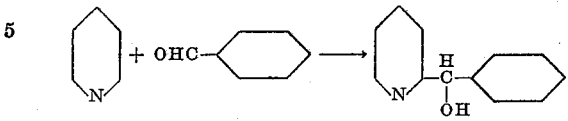

The yield was reported to be 39%.

I have found that I can prepare phenyl-2-pyridylcarbinol and also substituted phenyl-2-pyridylcarbinols by a simple, novel process from commercially available raw materials. By carefully controlling reaction conditions, I convert a 2-benzylpyridine or a 4-benzylpyridine to the corresponding phenylpyridylcarbinol.

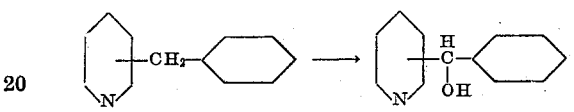

In like manner I convert 2-(p-chlorobenzyl)pyridine to p-chlorophenyl-2-pyridylcarbinol.

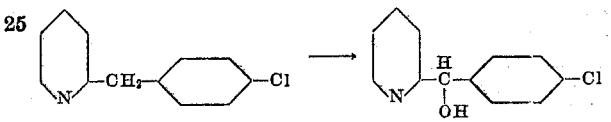

The following examples are illustrative of my process. The parts are by weight.

*Example 1*

To a solution of 169 parts of 2-benzylpyridine and about 180 parts of glacial acetic acid heated to a temperature of about 75° C., is added 210 parts of hydrogen peroxide (27.5% $H_2O_2$). The hydrogen peroxide is preferably added in small portions during a four hour period. The temperature of the solution is maintained at 75° C. during the addition of the hydrogen peroxide. After all of the hydrogen peroxide has been added, the solution is maintained at the elevated temperature for an additional 16–20 hours. Then the solution is heated to about 95° C. and about 18 parts of paraformaldehyde is added. The paraformaldehyde is added to destroy any unreacted peroxide. The peroxide free solution is concentrated by distilling off most of the water and acetic acid. The concentration is carried out under vacuum (30–75 mm. Hg) and is discontinued when no more distillate is obtained and the temperature of the liquid reaches about 95–100°. The concentrated reaction mixture is added, in small portions, to 600 parts of hot (95.100° C.) acetic anhydride. The resulting solution is maintained at 95.100° C. for about two hours. The resultant phenyl-2-pyridylcarbinol is recovered from the acetic anhydride solution in any suitable manner.

One convenient manner of recovering the phenyl-2-pyridylcarbinol is as follows: The acetic anhydride is removed by distillation under vacuum. To the residue remaining after the removal of the acetic anhydride is added 750 parts of a 10% aqueous caustic soda solution. The resulting mixture is heated at reflux conditions for about four to six hours. Then the mixture is cooled and thoroughly extracted with about 350 parts of benzene. The benzene extract contains the phenyl-2-pyridylcarbinol. Upon evaporating off the benzene, the phenyl-2-pyridylcarbinol crystallizes out. As so obtained, the phenyl-2-pyridylcarbinol has a freezing point of about 68.5° C. to 70° C. For many uses this is sufficiently pure. However, if a purer material is required, the almost pure compound may be further purified by recrystallization from a suitable solvent, such as benzene. The purified phenyl-2-pyridylcarbinol has a freezing point of about 72.5° C.

The yield of phenyl-2-pyridylcarbinol is 75% to 90% of the theoretical.

*Example 2*

The process of Example 1 is repeated save that in place of the 2-benzylpyridine, I use 2-parachlorobenzylpyridine. I thus obtain parachlorophenyl-2-pyridylcarbinol which has a freezing point of about 80° C.

*Example 3*

The process of Example 1 is repeated save that in place of the 2-benzylpyridine I use 4-benzylpyridine. I thus obtain phenyl-4-pyridylcarbinol.

*Example 4*

To a solution of 245 parts of diphenyl-4-pyridyl-methane and about 500 parts of acetic acid heated to a temperature of about 75° C., there is added about 116 parts of hydrogen peroxide of 50% strength. The hydrogen peroxide is preferably added in small portions during a three to four hour period. The temperature of the solution is maintained at about 75° C. during the addition of the hydrogen peroxide. After all of the hydrogen peroxide has been added, the solution is maintained at a temperature of from about 70° C. to about 80° C. for an additional 20 hours. Then, the temperature of the reaction mixture is raised to about 95° C. and formalin is added to decompose any hydrogen peroxide remaining in the reaction mixture. The peroxide free reaction mixture is concentrated by distilling off the water and most of the acetic acid. The concentrated reaction mixture is diluted with about 200 parts of acetic acid and the temperature elevated to about 100° C. To this hot mixture there is added, in small portions, 200 parts of acetic anhydride. The addition of the acetic anhydride causes a gradual temperature rise until the reaction mixture is refluxing gently. After all of the acetic anhydride has been added, the reaction mixture is refluxed for an additional four hours. The resulting diphenyl-4-pyridylcarbinol is recovered in any suitable manner.

One way of recovering the diphenyl-4-pyridylcarbinol is as follows: The reaction mixture is concentrated by distilling off most of the unreacted acetic anhydride and the acetic acid which was formed. Then to the concentrated reaction mixture there is added about 1,200 parts of a 15–20% aqueous sulfuric acid and the resulting solution is refluxed for about two hours. After cooling the solution it is diluted with 1,000 parts of water and then gaseous ammonia bubbled into the solution until the pH of the solution is about 4; the temperature of the solution is maintained at below about 40° C. during the addition of the ammonia. The diphenyl-4-pyridylcarbinol which was precipitated by the ammonia is removed by filtration.

*Example 5*

The process of Example 4 is repeated save that in place of the diphenyl-4-pyridylmethane I use phenyl-methyl-4-pyridylmethane and thus obtain phenyl-methyl-4-pyridyl-carbinol. The phenyl-methyl-4-pyridylcarbinol tends to dehydrate readily resulting in the formation of phenyl-4-pyridyl ethylene.

This application is a continuation-in-part of Serial No. 439,915 filed June 28, 1954, now abandoned.

I claim as my invention:

1. The process of preparing a compound of the class consisting of phenyl-2-pyridylcarbinols and phenyl-4-pyridylcarbinols having the following general formulae:

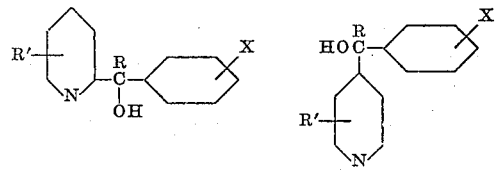

in which R represents one of the group consisting of hydrogen, lower alkyl, phenyl, and benzyl, R' represents hydrogen or lower alkyl, and X represents one of the group consisting of hydrogen and a halogen, which comprises reacting at an elevated temperature a mixture of acetic acid, hydrogen peroxide, and a compound of the class consisting of a 2-phenylpyridyl-methane and a 4-phenylpyridylmethane, heating the resulting reaction product with acetic anhydride and recovering the thus formed phenylpyridyl carbinol.

2. The process of claim 1 in which R is phenyl and X is hydrogen.

3. The process of preparing phenyl-2-pyridylcarbinol which comprises reacting, at a temperature of about 75° C., a mixture of acetic acid, hydrogen peroxide, and 2-benzyl-pyridine, removing the water and the unreacted acetic acid to obtain a concentrated reaction product, heating said reaction product with acetic anhydride and recovering the resultant phenyl-2-pyridylcarbinol.

4. The process of preparing parachlorophenyl-2-pyridylcarbinol which comprises reacting at a temperature of about 75° C. a mixture of acetic acid, hydrogen peroxide, and 2-parachlorobenzylpyridine, removing the water and unreacted acetic acid to obtain a concentrated reaction product, heating said reaction product with acetic anhydride, and recovering the resultant parachlorophenyl-2-pyridyl carbinol.

5. The process of preparing diphenyl-4-pyridylcarbinol which comprises reacting, at a temperature of about 75° C., a mixture of acetic acid, hydrogen peroxide, and diphenyl-4-pyridylmethane, removing the water and the unreacted acetic acid to obtain a concentrated reaction product, heating said reaction product with acetic anhydride and recovering the resultant diphenyl-4-pyridylcarbinol.

References Cited in the file of this patent

UNITED STATES PATENTS 2,735,851     Cislak _____ Feb. 21, 1956

OTHER REFERENCES

Tschitschibabin, Ber. Deut. Chem., vol. 37, pp. 1370–74 (1904).